United States Patent
Yoneoka

(10) Patent No.: US 7,525,686 B2
(45) Date of Patent: Apr. 28, 2009

(54) IMAGE PROCESSOR AND IMAGE PROCESSING PROGRAM FOR APPLYING IMAGE PROCESSING TO INPUT DATA AND TRANSFERRING THE SAME TO PRINT ENGINE

(75) Inventor: Hideharu Yoneoka, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 734 days.

(21) Appl. No.: 11/066,393

(22) Filed: Feb. 28, 2005

(65) Prior Publication Data

US 2005/0190391 A1 Sep. 1, 2005

(30) Foreign Application Priority Data

Mar. 1, 2004 (JP) ............................ P2004-056283

(51) Int. Cl.
H04N 1/40 (2006.01)
(52) U.S. Cl. ....................................... 358/1.9; 358/527
(58) Field of Classification Search .................. 358/1.9, 358/2.1, 500, 527; 382/173–180
See application file for complete search history.

(56) References Cited

U.S. PATENT DOCUMENTS 5,016,096 A * 5/1991 Matsunawa et al. ......... 358/538
6,788,441 B1 * 9/2004 Ohkawa ...................... 358/520
7,057,771 B2 * 6/2006 Ohkawa ...................... 358/1.9

FOREIGN PATENT DOCUMENTS

| JP | 06-238950 | 8/1994 |
|---|---|---|
| JP | 08-149288 | 6/1996 |
| JP | 09-083811 | 3/1997 |
| JP | 10-042156 | 2/1998 |
| JP | 10-100453 | 4/1998 |
| JP | 11-027539 | 1/1999 |
| JP | 2000-115550 | 4/2000 |
| JP | 2002354268 A * | 12/2002 |

* cited by examiner

Primary Examiner—Thomas D Lee
Assistant Examiner—Stephen M Brinich
(74) Attorney, Agent, or Firm—The Nath Law Group; Jerald L. Meyer; Sungyeop Chung

(57) ABSTRACT

The effective image area detector 4 detects an effective image area within image data subjected to color conversion, and an image processing/screening unit 5 applies image processing to image data in the effective image area and transfers the processed image data in the effective image area to a print engine together with position and size information of the effective image area. This reduces image processing time and data transfer time to the print engine, thereby reducing printing time of image data.

5 Claims, 5 Drawing Sheets

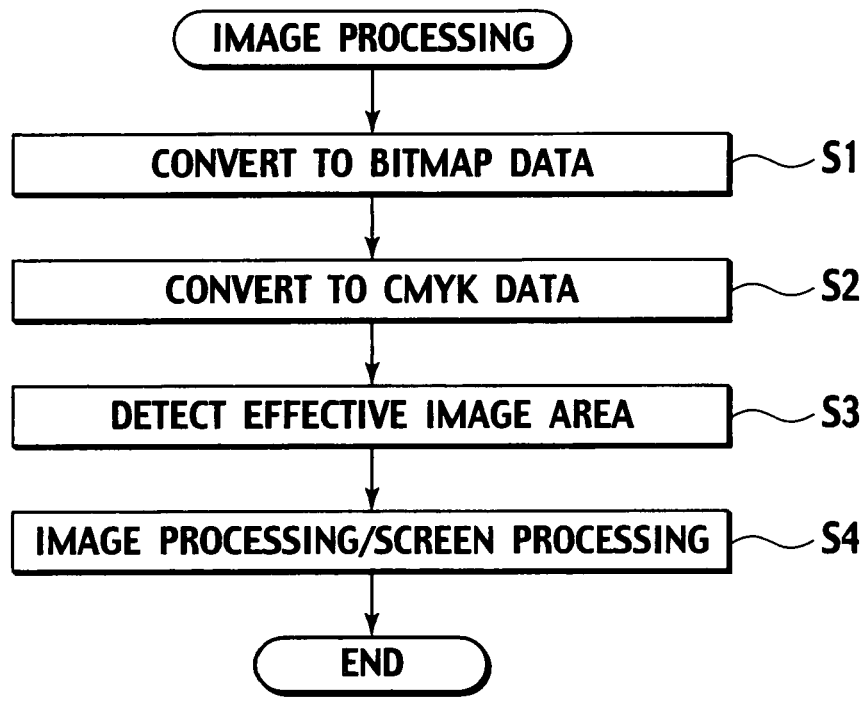
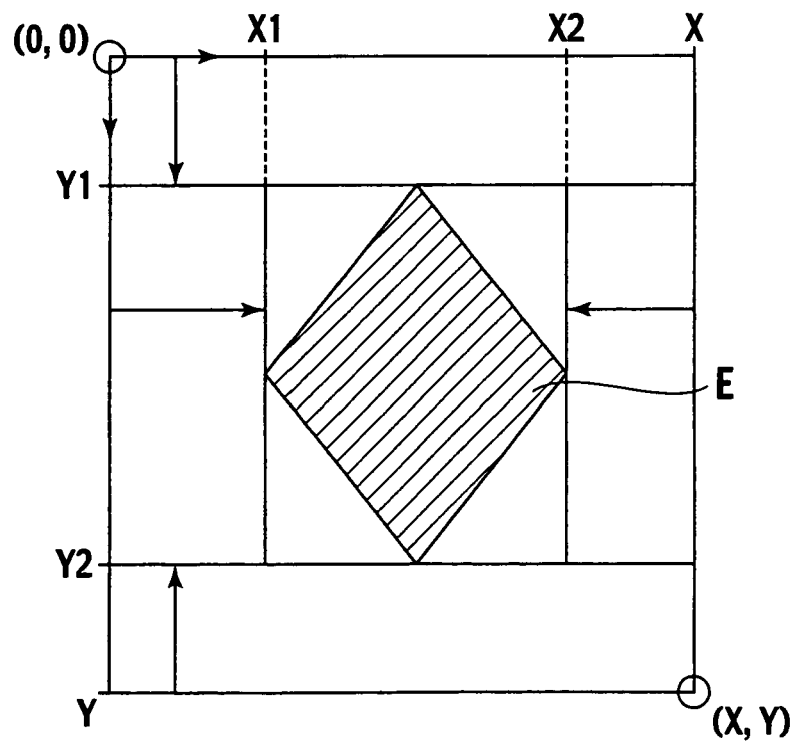

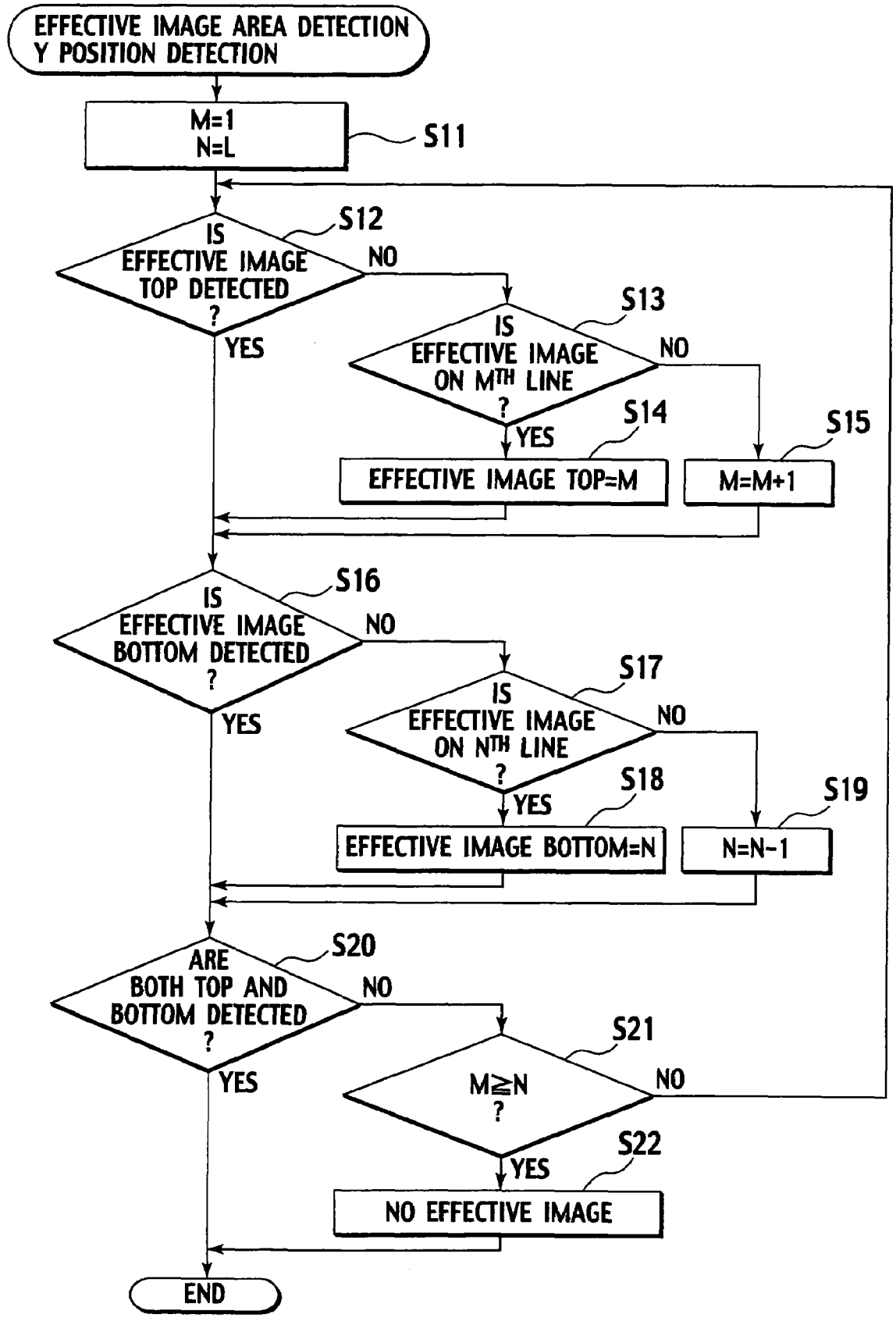

IMAGE PROCESSOR AND IMAGE PROCESSING PROGRAM FOR APPLYING IMAGE PROCESSING TO INPUT DATA AND TRANSFERRING THE SAME TO PRINT ENGINE

BACKGROUND OF THE INVENTION

The present invention relates to an image processor and an image processing program for applying image processing to input data and transferring the data to a print engine. More particularly, the present invention relates to a technique for reducing the time for printing input data by reducing image processing time and data transfer time to a print engine.

Generally in full color printers, in response to an input of RGB data from an application program (hereinafter referred to as "an application"), an internal controller (data generating unit) converts the RGB data to raster data (bitmap data), which is followed by color conversion to CMYK data. As disclosed in Japanese Patent Application Laid-Open Nos. H6-238950 and H9-83811, the internal controller subsequently converts the CMYK data to data having a small number of gradations consistent with the printing capability of a print engine by executing image processing such as error diffusion and halftone processing, and then transfers the resultant data to the print engine, so that an image is formed on a print sheet.

In the full color printer thus configured, since the data volume processed by the controller is four times as large as that with a monochrome printer, the image processing time and data transfer time to the print engine in the full color printer are longer compared to the monochrome printer, and accordingly long time is required to print the input data.

The present invention has been achieved in order to solve the above problem, and it is an object of the present invention to provide an image processor and an image processing program that can reduce the time for printing input data by reducing image processing time and data transfer time to a print engine.

SUMMARY OF THE INVENTION

An image processor and an image processing program according to the present invention detect an effective image area within image data in advance of image processing, apply the image processing only to image data in the detected effective image area, and transfer the processed image data in the effective image area to a print engine together with position and size information of the effective image area.

According to the above configuration of the present invention, the image processing is subjected only to the image data in the effective image area, which reduces image processing time. Furthermore, only the image data in the effective image area is transferred to the print engine together with the position and size information of the effective image area, which also reduces data transfer time. That is, the image processor and the image processing program according to the present invention can reduce both the image processing time and the data transfer time, and consequently reduce printing time of image data.

When the image data is converted to CMYK format, the effective image area is preferably detected from each of CMYK color planes. In this case, it is desirable to determine an intermediate coordinate system that is common to all the CMYK color planes and to transfer to the print engine the position and size information of each effective image area calculated based on the intermediate coordinate system together with the position information of the origin of the determined intermediate coordinate system. According to this configuration, by only changing the position of the origin of the intermediate coordinate system, the image printing positions of all the CMYK color planes can be adjusted in vertical and lateral directions with the positional relationship among these color planes maintained securely.

Moreover, in order to detect the effective image area, it is desirable to first search transverse lines of image data in up and down directions so as to detect one transverse line on which an upper end of the effective image area is positioned and another transverse line on which a lower end of the effective image area is positioned, and next to search longitudinal lines running between the detected two transverse lines in left and right directions so as to detect one longitudinal line on which a left end of the effective image area is positioned and another longitudinal line on which a right end of the effective image area is positioned. According to this configuration, the effective image area can be detected efficiently even when an effective image is deviated either upward or downward.

BRIEF DESCRIPTION OF THE DRAWINGS

FIG. 2 is a flowchart of image processing executed by the image processor shown in FIG. 1;

FIG. 3 is a conceptual diagram of the effective image area detection processing shown in FIG. 2;

FIG. 4 is a flowchart of detection processing of the effective image area in up and down directions of a page image;

DETAILED DESCRIPTION OF THE PREFERRED EMBODIMENTS

The present invention is applicable to an image processor 1 which applies image processing to image data input from an application and transfers the processed image data to a print engine which forms an image on a print sheet. With reference to the accompanying drawings, a configuration and operations of the image processor 1 according to an embodiment of the present invention will be described in detail below.

Figure 1:
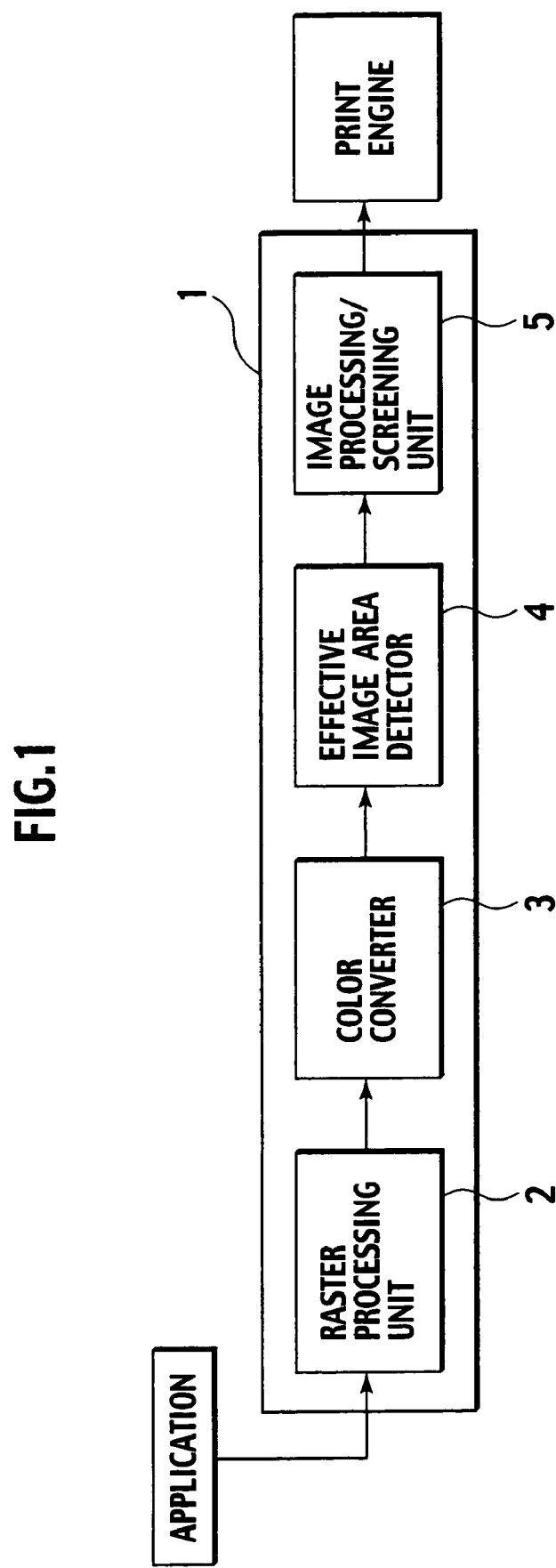
FIG. 1 is a block diagram showing a configuration of an image processor according to an embodiment of the present invention.

The image processor 1 according to the embodiment of the present invention is provided in an image forming apparatus such as a full color printer, and mainly includes, as shown in FIG. 1, a raster processing unit 2, a color converter 3, an effective image area detector 4, and an image processing/screening unit 5. The image processor 1 applies image processing to image data input from an application, and then transfers the processed image data to a print engine which forms an image on a print sheet.

Each component in the image processor 1 may be configured either as a hardware component by using circuitry, or through software by defining a function of each component with a computer program. Furthermore, in the present embodiment, the image processor 1 is provided in the image forming apparatus, however, the image processor 1 may be provided at any position as long as it can transmit and receive image data via an electric communication line.

Thus configured image processor 1 reduces the time required to process image data (image processing time) and the time required to transfer the processed image data to the print engine (data transfer time) by executing image processing described below. With reference to the flowchart shown in FIG. 2, the internal operation of the image processor 1 when it executes the image processing will be explained in detail below.

The flowchart shown in FIG. 2 starts when the image processor 1 is powered on and RGB data is input from an application to the raster processing unit 2. The image processing then proceeds to step S1. The RGB data input from the application is composed of character data, vector data, or image data of the RGB (red, green, blue) color. In addition, each color of the RGB is assigned 8 bits of data per pixel to represent 0 to 255 levels of gradation.

In step S1, the raster processing unit 2 converts the RGB data to raster data (bitmap data), and then inputs the resultant RGB data to the color converter 3. Then, the processing in step S1 is completed, whereupon the image processing proceeds from step S1 to step S2.

In step S2, the color converter 3 converts the RGB data to CMYK (cyan, magenta, yellow, black) data for color conversion, and then inputs the CMYK data to the effective image area detector 4. Upon this color conversion, the color converter 3 preferably utilizes conversion information such as the ICC (International Color Consortium) profile in order to take into account color characteristics of the print engine. Each color of the CMYK is assigned 8 bits of data per pixel. When the processing in step S2 is completed, the image processing proceeds from step S2 to step S3.

In step S3, the effective image area detector 4 detects an effective image area from each CMYK color plane of the CMYK data, and then inputs the CMYK data to the image processing/screening unit 5, together with the position and size information of the detected effective image areas of each color plane. As shown specifically in FIG. 3, assuming that the left top corner of the page image is the origin (0, 0), the effective image area detector 4 retrieves transverse lines in both up and down (Y) directions of the page image and retrieves longitudinal lines in left and right (X) directions of the page image, so as to detect an uppermost line (Y=Y1) a bottommost line (Y=Y2), a leftmost line (X=X1), and a rightmost line (X=X2), of the effective image area E. Then, the effective image area detector 4 inputs the position information of the detected lines to the image processing/screening unit 5 together with the CMYK data. Details of a method for detecting the effective image area will be described later with reference to the flowcharts shown in FIGS. 4 and 5. When the processing in step S3 is completed, the image processing proceeds from step S3 to step S4.

In step S4, the image processing/screening unit 5 applies image processing and screen processing to the CMYK data of the effective image area by referring to the position and size information of the effective image area, and then inputs the image-processed and screen-processed CMYK data to the print engine together with the position and size information of the effective image area. It is desirable for the image processing/screening unit 5 to input to the print engine, information as to whether all the CMYK color planes have their respective effective image areas, in order to reduce the processing load of the print engine. Using the information input from the image processing/screening unit 5, the print engine prints an image on a print sheet. Then, the processing in step S4 is completed, whereupon a series of the image processing ends.

The detection processing of the effective image area in the step S3 is explained below in detail with reference to the flowcharts shown in FIGS. 4 and 5.

The flowchart shown in FIG. 4 starts upon completion of the processing in step S2, and the detection processing proceeds to step S11. The effective image area detector 4 detects an uppermost line (Y=Y1) and a bottommost line (Y=Y2) of the effective image area of each CMYK color plane, by executing the following detection processing for each color plane.

In step S11, the effective image area detector 4 sets the values of parameters M and N to 1 and L, respectively. These parameters M and N each indicate a line number used for retrieving an effective image in up and down directions of the page image, and the line numbers for a top end and bottom end of the page image are 0 and L, respectively, in this embodiment. When the processing in step S11 is completed, the detection processing proceeds from step S11 to step S12.

In step S12, the effective image area detector 4 determines whether the uppermost line of the effective image area (effective image top) is detected. When the effective image top is detected, the effective image area detector 4 advances the detection processing to step S16. On the other hand, when the effective image top is not detected, the effective image area detector 4 advances the detection processing to step S13.

In step S13, the effective image area detector 4 determines whether the effective image exists on an $M^{th}$ line of the page image. When the effective image exists on the $M^{th}$ line of the page image, the effective image area detector 4 sets the effective image top as being detected by defining the effective image top Y1=M in step S14, and thereafter advances the detection processing to step S16.

When the effective image does not exist on the $M^{th}$ line of the page image, the effective image area detector 4 lowers the retrieval line for retrieving the effective image top by one line by incrementing the value of the parameter M by 1 in step S15, and then advances the detection processing to step S16.

In step S16, the effective image area detector 4 determines whether the bottommost line of the effective image area (effective image bottom) is detected. When the effective image bottom is detected, the effective image area detector 4 advances the detection processing to step S20. On the other hand, when the effective image bottom is not detected, the effective image area detector 4 advances the detection processing to step S17.

In step S17, the effective image area detector 4 determines whether the effective image exists on an $N^{th}$ line of the page image. When the effective image exists on the $N^{th}$ line of the page image, the effective image area detector 4 sets the effective image bottom as being detected by defining the effective image bottom Y2=N in step S18, and thereafter advances the detection processing to step S20.

On the other hand, when the effective image does not exist on the $N^{th}$ line of the page image, the effective image area detector 4 raises the retrieval line for retrieving the effective image bottom by one line by decrementing the value of the parameter N by 1 in step S19, and then advances the detection processing to step S20.

In step S20, the effective image area detector 4 determines whether both the effective image top and the effective image bottom are detected. When the both are detected, the effective image area detector 4 terminates a series of the detection processing.

When neither of the effective image top nor the effective image bottom is detected, the effective image area detector 4 determines whether the retrieval line for the effective image top and the retrieval line for the effective image bottom are replaced with each other in a vertical direction of the page image, by determining whether the value of the parameter N is less than the value of the parameter M.

When the value of the parameter N is determined to be not less than the value of the parameter M, the effective image area detector 4 determines that the retrieval line for the effective image top and the retrieval line for the effective image bottom are not replaced with each other in a vertical direction of the page image, and then advances the detection processing to step S12. When the value of the parameter N is determined to be less than the value of the parameter M, the effective image area detector 4 determines that the retrieval line for the effective image top and the retrieval line for the effective image bottom are replaced with each other in a vertical direction of the page image, and therefore determines that no effective image exists within the page image (blank sheet of paper) in step S22, whereupon a series of the detection processing is terminated.

In this manner, when the detection processing of the uppermost and bottommost lines of the effective image area is completed, the effective image area detector 4 executes the next processing for detecting a leftmost line and a rightmost line of the effective image area of each CMYK color plane. With reference to the flowchart shown in FIG. 5, operations of the effective image area detector 4 when it detects the leftmost and the rightmost lines of the effective image area will be explained in detail below.

Figure 5:
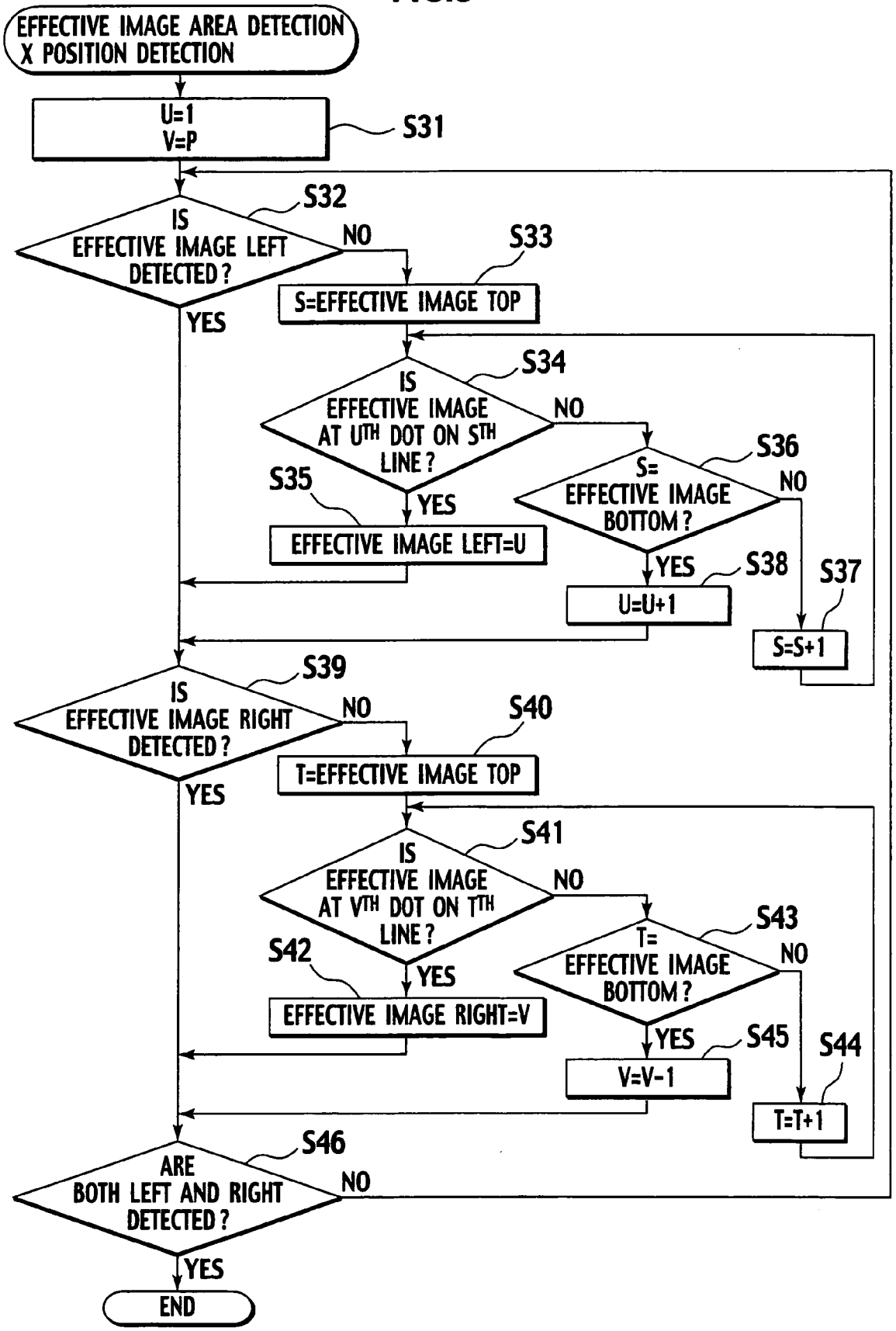
FIG. 5 is a flowchart of detection processing of the effective image area in left and right directions of the page image.

The flowchart shown in FIG. 5 starts upon completion of the detection processing of the uppermost and the bottommost lines of the effective image area, and the detection processing advances to step S31. The effective image area detector 4 detects the leftmost line (X=X1) and the rightmost line (X=X2) of the effective image area of each CMYK color plane, by executing the following detection processing for each color plane.

In step S31, the effective image area detector 4 sets the values of parameters U and V to 1 and P, respectively. These parameters U and V each indicate a pixel number used for retrieving an effective image in right and left directions of the page image, and the pixel numbers of a left end and a right end of the page image are 1 and P, respectively, in this embodiment. When the processing in step S31 is completed, the detection processing proceeds from step S31 to step S32.

In step S32, the effective image area detector 4 determines whether the leftmost line of the effective image area (effective image left) is detected. When the effective image left is detected, the effective image area detector 4 advances the detection processing to step S39. When the effective image left is not detected, the effective image area detector 4 advances the detection processing to step S33.

In step S33, the effective image area detector 4 sets the value of parameter S to the line number Y1 of the effective image top so as to start retrieving leftward from the uppermost line of the effective image. Then, the processing in step S33 is completed, whereupon the detection processing proceeds from step S33 to step S34.

In step S34, the effective image area detector 4 determines whether the effective image exists at a $U^{th}$ dot on an $S^{th}$ line of the page image. When the effective image exists at the $U^{th}$ dot on the $S^{th}$ line of the page image, the effective image area detector 4 sets the effective image left as being detected by defining the effective image left X1=U in step S35, and thereafter advances the detection processing to step S39.

On the other hand, when the effective image does not exist at the $U^{th}$ dot on the $S^{th}$ line of the page image, the effective image area detector 4 determines whether the value of the parameter S is the line number Y2 of the effective image bottom in step S36. When the value of the parameter S is not the line number Y2 of the effective image bottom, the effective image area detector 4 lowers the retrieval line by one line by incrementing the value of the parameter S by 1 in step S37, and then returns the detection processing to step S32. When the value of the parameter S is the line number Y2 of the effective image bottom, the effective image area detector 4 shifts rightward a pixel position for retrieving the effective image by one pixel by incrementing the value of the parameter U by 1 in step S38, and then advances the detection processing to step S39.

In step S39, the effective image area detector 4 determines whether the rightmost line of the effective image area (effective image right) is detected. When the effective image right is detected, the effective image area detector 4 advances the detection processing to step S46. When the effective image right is not detected, the effective image area detector 4 advances the detection processing to step S40.

In step S40, the effective image area detector 4 sets the value of parameter T to the line number Y1 of the effective image top so as to start retrieving rightward from the uppermost line of the effective image. Then, the processing in step S40 is completed, whereupon the detection processing proceeds from step S40 to step S41.

In step S41, the effective image area detector 4 determines whether the effective image exists at a $V^{th}$ dot on a $T^{th}$ line of the page image. When the effective image exists at the $V^{th}$ dot on the $T^{th}$ line of the page image, the effective image area detector 4 sets the effective image right as being detected by defining the effective image right X2=V in step S42, and thereafter advances the detection processing to step S46.

On the other hand, when the effective image does not exist at the $V^{th}$ dot on the $T^{th}$ line of the page image, the effective image area detector 4 determines whether the value of the parameter T is the line number Y2 of the effective image bottom in step S43. When the value of the parameter T is not the line number Y2 of the effective image bottom, the effective image area detector 4 lowers the retrieval line by one line by incrementing the value of the parameter T by 1 in step S44, and then returns the detection processing to step S41. When the value of the parameter T is the line number Y2 of the effective image bottom, the effective image area detector 4 shifts leftward a pixel position for retrieving the effective image by one pixel by decrementing the value of the parameter V by 1 in step S38, and thereafter advances the detection processing to step S46.

In step S46, the effective image area detector 4 determines whether both the effective image left and the effective image right are detected. When the both are detected, the effective image area detector 4 terminates a series of the detection processing. When neither of the effective image left nor the effective image right is detected, the effective image area detector 4 returns the detection processing to step S32.

Figure 6:
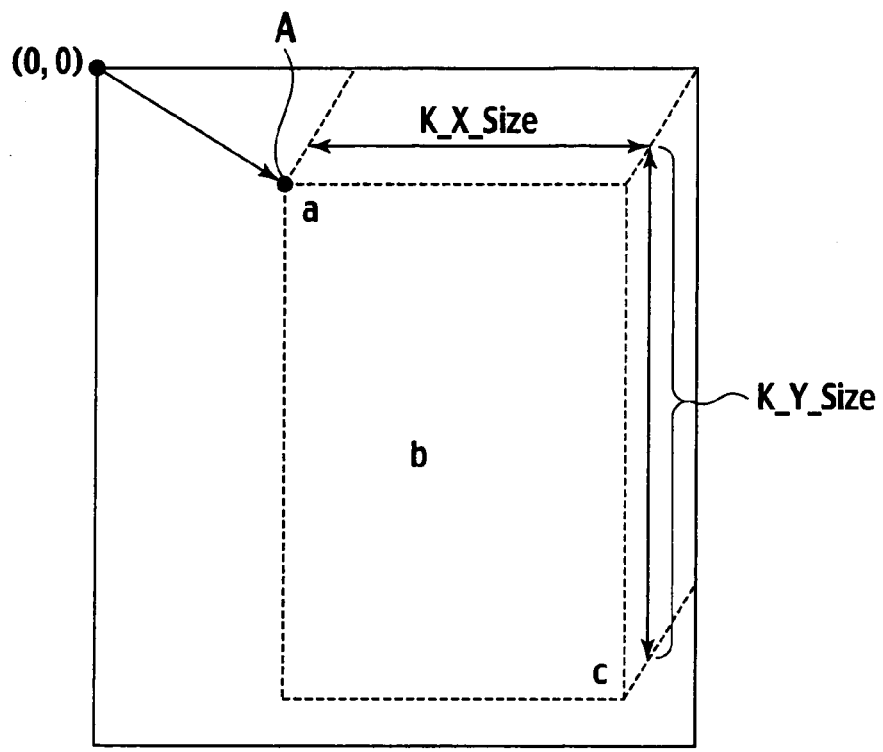
FIG. 6 is an explanatory view of a method for calculating position and size information of the effective image area.

In this manner, when the detection processing of all the uppermost line, the bottommost line, the leftmost line, and the rightmost line of each CMYK color plane is completed, the effective image area detector 4 determines the position of each CMYK color plane according to the position information of the uppermost line, the bottommost line, the leftmost line, and the rightmost line. For a K plane for example, as shown in FIG. 6, the effective image area detector 4 calculates the coordinates of the point A (K_X_Offset1, K_Y_Offset1), which indicates the position of the effective image area for the K plane, and further calculates the size of the effective image area in the X and Y directions (K_X_Size, K_Y_Size), and subsequently inputs the calculated values to the image processing/screening unit 5.

Figure 7:
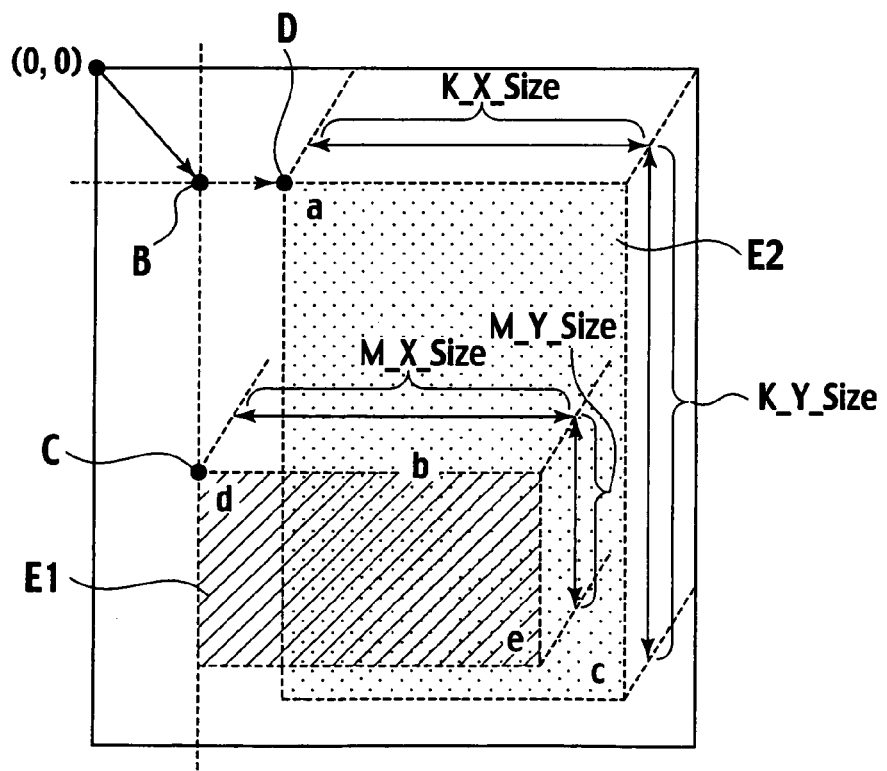
FIG. 7 is an explanatory view of a method for calculating position information of the effective image area using an intermediate coordinate point.

For easier adjustment of image positions of all CMYK color planes, the effective image area detector 4 may set an intermediate coordinate system whose origin is the point B (X_offset, Y_Offset) and which is common to all CMYK color planes as shown in FIG. 7, and input the position and size information of the effective image area which is calculated based on this intermediate coordinate system. More specifically, the effective image area detector 4 sets the point nearest to the effective image area of each CMYK color plane as viewed from the origin (0, 0) of the absolute coordinate system to the origin B of the intermediate coordinate system, in order for the origin of the intermediate coordinate system to include all the effective image areas of CMYK color planes. That is, the effective image area detector 4 sets (min(K_X_Offset1, C_X_Offset1, M_X_Offset1, Y_X_Offset1), min(K_Y_Offset1, C_Y_Offset1, M_Y_Offset1, Y_Y_Offset1)) to the origin B of the intermediate coordinate system.

FIG. 7 shows the positional relationship between the M plane effective image area E1 and the K plane effective image area E2, and the absolute coordinate system origin (0, 0) and the intermediate coordinate system origin (X_offset, Y_Offset). As apparent from the above explanation, the position C of the M plane effective image area E1 and the position D of the K plane effective image area E2 are calculated to be (M_X_Offset1-X_offset, M_Y_Offset1-Y_offset) and (K_X_Offset1-X_offset, K_Y_Offset1-Y_offset), respectively in the intermediate coordinate system.

As is clear from the above explanation, according to the image processor 1 in the embodiment of the present invention, the effective image area detector 4 detects an effective image area within image data that is subjected color conversion, and the image processing/screening unit 5 applies image processing only to image data in the effective image area and transfers the processed image data in the effective image area to the print engine together with the position and size information of the effective image area. Therefore, the image processing time and the data transfer time to the print engine are shortened, which consequently reduces the printing time of image data.

Furthermore, according to the image processor 1 in the embodiment of the present invention, the image processing/screening unit 5 sets an intermediate coordinate system whose origin is the point B (X_offset, Y_Offset) and which is common to all CMYK color planes, and transfers to the print engine the position and size information of the effective image area which is calculated based on the intermediate coordinate system together with the position information of the origin of this intermediate coordinate system. Therefore, by only changing the position of the origin of the intermediate coordinate system, the image printing positions of all the CMYK color planes are adjustable in vertical and lateral directions with the positional relationship among these color planes maintained securely.

Moreover, according to the image processor 1 in the embodiment of the present invention, the effective image area detector 4 first retrieves transverse lines of image data in up and down directions so as to detect one transverse line on which an upper end of the effective image area is positioned and another transverse line on which a lower end of the effective image area is positioned, and next retrieves longitudinal lines running between the detected two transverse lines in left and right directions so as to detect one longitudinal line on which a left end of the effective image area is positioned and another longitudinal line on which a right end of the effective image area is positioned. Therefore, the effective image area can be detected efficiently even when an effective image is deviated either upward or downward.

While the embodiment to which the present invention made by the present inventor is applied has been explained, the invention is not limited to the descriptions and drawings according to this particular embodiment which constitute a part of the disclosure of the present invention. For example, in the above embodiment, the effective image area detector 4 detects one effective image area for each color plane of each page, however, two or more effective image areas may be detected for each color plane. Furthermore, in the case of banding for one color plane of one page, the effective image area detector 4 may calculate sub-effective image areas of each band and integrates these sub-effective image areas of each band together after completion of the processing for all bands, in order to calculate the whole one effective image area. Thus, it is to be understood that all other embodiments, examples, and operational techniques made by those skilled in the art based on the foregoing embodiment would fall within the scope of the present invention.

The entire content of a Patent Application No. TOKUGAN 2004-56283 with a filing date of Mar. 1, 2004, is hereby incorporated by reference.

What is claimed is:

1. An image processor comprising:
a raster processing unit that converts image data input from an application program to raster data;
a color converter that converts a color format of the image data converted to the raster data;
an effective image area detector that detects an effective image area in a page image of the image data after the color conversion; and
an image processing unit that applies image processing to only image data of the effective image area, and transfers the processed image data of the effective image area together with position and size information of the effective image area to a print engine that forms an image on a print sheet.

2. The image processor according to claim 1, wherein the color converter converts the color format of the image data converted to the raster data to a CMYK format, and the effective image area detector detects the effective image area for each CMYK color plane.

3. The image processor according to claim 2, wherein the image processing unit determines an intermediate coordinate system that is common to all the CMYK color planes, and transfers to the print engine, position and size information of each effective image area calculated based on the determined intermediate coordinate system together with position information of the origin of the determined intermediate coordinate system.

4. The image processor according to claim 1, wherein the effective image area detector first retrieves transverse lines of the image data in up and down directions to detect one transverse line on which an upper end of the effective image area is positioned and another transverse line on which a lower end of the effective image area is positioned, and next retrieves longitudinal lines running between the detected two transverse lines in left and right directions to detect one longitudinal line on which a left end of the effective image area is positioned and another longitudinal line on which a right end of the effective image area is positioned.

5. A method for image processing, executable by a computer, the method comprising the steps of:
converting image data input from an application program to raster data;

converting a color format of the image data converted to the raster data;

detecting an effective image area in a page image of the image data after the color conversion; and applying image processing to only image data of the effective image area and transferring the processed image data of the effective image area together with position and size information of the effective image area to a print engine that forms an image on a print sheet.

* * * * *